US012340674B2

(12) United States Patent
Andrews et al.

(10) Patent No.: US 12,340,674 B2
(45) Date of Patent: Jun. 24, 2025

(54) RISK OF FALL DETECTION SYSTEM AND POSTURE MONITORING AND CORRECTION SYSTEM

(71) Applicants: Craig Andrews, Loudon, TN (US); William V. Padula, Guilford, CT (US); Chris Andrews, Mishawaka, IN (US)

(72) Inventors: Craig Andrews, Loudon, TN (US); William V. Padula, Guilford, CT (US); Chris Andrews, Mishawaka, IN (US)

(73) Assignee: NEUROAEYE, LLC, Louisville, KY (US)

( * ) Notice: Subject to any disclaimer, the term of this patent is extended or adjusted under 35 U.S.C. 154(b) by 0 days.

(21) Appl. No.: 18/602,808

(22) Filed: Mar. 12, 2024

(65) Prior Publication Data

US 2024/0304073 A1 Sep. 12, 2024

Related U.S. Application Data

(62) Division of application No. 18/181,680, filed on Mar. 10, 2023, now Pat. No. 11,967,217.

(51) Int. Cl.

| | |
|---|---|
| ***G08B 21/04*** | (2006.01) |
| ***A41D 13/018*** | (2006.01) |
| ***A63B 24/00*** | (2006.01) |
| ***G08B 7/06*** | (2006.01) |
| ***G08B 21/18*** | (2006.01) |
| ***G08B 29/18*** | (2006.01) |

(52) U.S. Cl.

CPC ....... *G08B 21/0446* (2013.01); *A41D 13/018* (2013.01); *A63B 24/0006* (2013.01); *A63B 24/0075* (2013.01); *G08B 7/06* (2013.01); *G08B 21/0492* (2013.01); *G08B 21/182* (2013.01); *G08B 29/186* (2013.01); *A63B 2220/12* (2013.01); *A63B 2220/836* (2013.01); *A63B 2230/625* (2013.01)

(58) Field of Classification Search

CPC .................. G08B 21/0446; G08B 7/06; G08B 21/0492; G08B 21/182; G08B 29/186; A41D 13/018; A63B 24/0006; A63B 24/0075; A63B 2220/12; A63B 2220/836; A63B 2230/625

USPC ....................................................... 340/573.1

See application file for complete search history.

(56) References Cited

U.S. PATENT DOCUMENTS

| | | | | |
|---|---|---|---|---|
| 8,773,256 | B2 * | 7/2014 | Ten Kate | G08B 21/04 600/595 |
| 9,138,174 | B2 * | 9/2015 | Jin | A61B 5/1117 |
| 9,551,804 | B1 * | 1/2017 | Kechichian | A61B 5/1117 |
| 10,055,948 | B2 * | 8/2018 | Kim | A61B 5/0816 |
| 10,182,746 | B1 * | 1/2019 | Demiralp | A61B 5/1118 |
| 10,327,670 | B2 * | 6/2019 | Etemad | A61B 5/7225 |
| 11,278,765 | B2 * | 3/2022 | Mohrman | A61B 5/7271 |
| 2006/0001545 | A1 * | 1/2006 | Wolf | A47K 3/001 340/686.1 |

(Continued)

*Primary Examiner* — Zhen Y Wu

(74) *Attorney, Agent, or Firm* — Christopher M. Ramsey; GrayRobinson, P.A.

(57) ABSTRACT

An example of a posture monitoring and correction system monitors user's posture and induces corrective action. The system includes a wearable monitoring group that acquires posture data with a group of sensors. A processing module is in signal communication with the wearable monitoring group to receive the posture data and compute a risk of injury parameter. Correction elements induce a corrective action in the user's body upon the risk of injury indicator parameter exceeding a threshold level.

22 Claims, 4 Drawing Sheets

(56) References Cited

U.S. PATENT DOCUMENTS

| | | | | |
|---|---|---|---|---|
| 2010/0121228 | A1* | 5/2010 | Stirling | A61B 5/6804 600/595 |
| 2010/0286571 | A1* | 11/2010 | Allum | A61B 5/486 600/595 |
| 2011/0208444 | A1* | 8/2011 | Solinsky | A61B 5/1114 702/41 |
| 2012/0050031 | A1* | 3/2012 | Ten Kate | G08B 21/04 340/539.11 |
| 2012/0072168 | A1* | 3/2012 | Yin | A61B 5/1118 702/150 |
| 2014/0111414 | A1* | 4/2014 | Hayner | G06F 3/016 345/156 |
| 2014/0276242 | A1* | 9/2014 | Chen | A61B 5/1116 600/595 |
| 2015/0087995 | A1* | 3/2015 | Murai | A61B 5/684 600/595 |
| 2015/0226764 | A1* | 8/2015 | Ten Kate | G01C 22/006 702/141 |
| 2015/0309563 | A1* | 10/2015 | Connor | A61B 5/1071 73/865.4 |
| 2015/0366504 | A1* | 12/2015 | Connor | A61B 5/6804 600/301 |
| 2016/0175646 | A1* | 6/2016 | Jacobson | A61B 5/486 434/247 |
| 2016/0203692 | A1* | 7/2016 | Ten Kate | G08B 21/0446 340/573.1 |
| 2016/0310064 | A1* | 10/2016 | Cheng | A61B 5/1116 |
| 2017/0154505 | A1* | 6/2017 | Kim | G08B 6/00 |
| 2018/0174420 | A1* | 6/2018 | Clark | G08B 25/10 |
| 2019/0103007 | A1* | 4/2019 | Tan | A61B 5/742 |
| 2020/0237291 | A1* | 7/2020 | Sundaram | A61B 5/4528 |
| 2021/0192920 | A1* | 6/2021 | Stenlund | B60R 25/01 |
| 2021/0315764 | A1* | 10/2021 | Decastro | A61H 3/00 |
| 2022/0183404 | A1* | 6/2022 | Yanagisawa | A41D 13/018 |
| 2022/0183591 | A1* | 6/2022 | Korhonen | G16H 50/30 |

* cited by examiner

RISK OF FALL DETECTION SYSTEM AND POSTURE MONITORING AND CORRECTION SYSTEM

CROSS-REFERENCE TO RELATED APPLICATION

This is a divisional of application Ser. No. 18/181,680, filed Mar. 10, 2023, which is incorporated by reference in its entirety.

FIELD

The present disclosure is related to a system configured to determine the risk of fall for an individual based on posture by monitoring sensors placed on the individual's body over a period of time.

The present disclosure is also related to a posture monitoring system configured to induce a posture corrective action aimed to reduce the risk of fall and/or to prevent muscle, bone and tendon injury.

Furthermore, the present disclosure regards the use of a garment to track the movements of a user's body while performing athletic activities.

BACKGROUND

There are many factors that increase the risk of fall. Besides old age, these factors include mobility problems, balance disorders, chronic illnesses, and impaired vision.

Many falls cause at least some injury that range from mild bruising to broken bones, head injuries and even death. In fact, falls are a leading cause of death in older adults.

Currently, Medicare pays physicians to determine their patients' risk of fall by subjectively asking them pertinent questions over a period of 30 minutes or so.

However, there is no accepted objective method to determine the risk of fall which causes billions of dollars annually for Medicare and loss of life and quality of life for patients.

The most common method is to time the period for a person to get out of a chair, walk 10 feet, turn and return to the chair and sit down. This test is called the Timed Up and Down Test (TUG).

Disadvantageously, the common methods used to determine the risk of fall of an individual are time consuming and therefore quite expensive, indeed, they require a physician to ask questions and perform physical motion tests (i.e. TUG).

Moreover, the common methods are not always accurate because they rely on the subjective judgment of the physician who bases his/her medical report on the patient's responses and brief physical performance.

BRIEF SUMMARY

In this context, the object of the present disclosure is to provide a system able to monitor an individual's posture over a period of time and reliably determine the individual's Risk of Fall.

Moreover, it is an object of the present disclosure to provide a posture monitoring, warning and correction system configured to monitor the posture of a user's body, train, prevent, or reduce the Risk of a Fall and induce a corrective action to pull posture changes into place that reduce the risk of fall and/or prevent muscle, bone and tendon injuries.

BRIEF DESCRIPTION OF THE DRAWINGS

Further embodiments and advantages of the present invention will appear more clearly from the non-limiting description of a preferred but not exclusive embodiment of the risk of fall detection system and a posture monitoring and correction system, as illustrated in the enclosed drawings in which.

DETAILED DESCRIPTION

With reference to the attached figures, the present disclosure relates to a risk of fall detection system 1.

The risk of fall detection system 1 is configured to carry out a fall risk assessment, i.e. it can be used to find out if an individual has a low, moderate, or high risk of falling. If the assessment shows that the individual is at an increased risk, a health care provider and/or caregiver may recommend strategies to prevent falls and reduce the chance of injury.

Moreover, the risk of fall detection system can be also used to monitor persons with high risk of falling 24/7 so as to alert physicians or caregivers when a fall occurs or to reliably diagnose an increased risk of falling. If a fall occurs, the same system could immediately contact the caregiver or an emergency service to bring aid and assistance to the person.

The risk of fall detection system 1 comprises a wearable monitoring group 2 configured to acquire posture data related to the posture of a user, such as an individual upon whom a risk of fall assessment is being conducted or an elderly person who needs to be constantly monitored.

The wearable monitoring group 2 is configured to monitor the posture of a user's body in a monitoring region that can range from a specific region—such as the user's torso—to the whole body.

Figure 1:
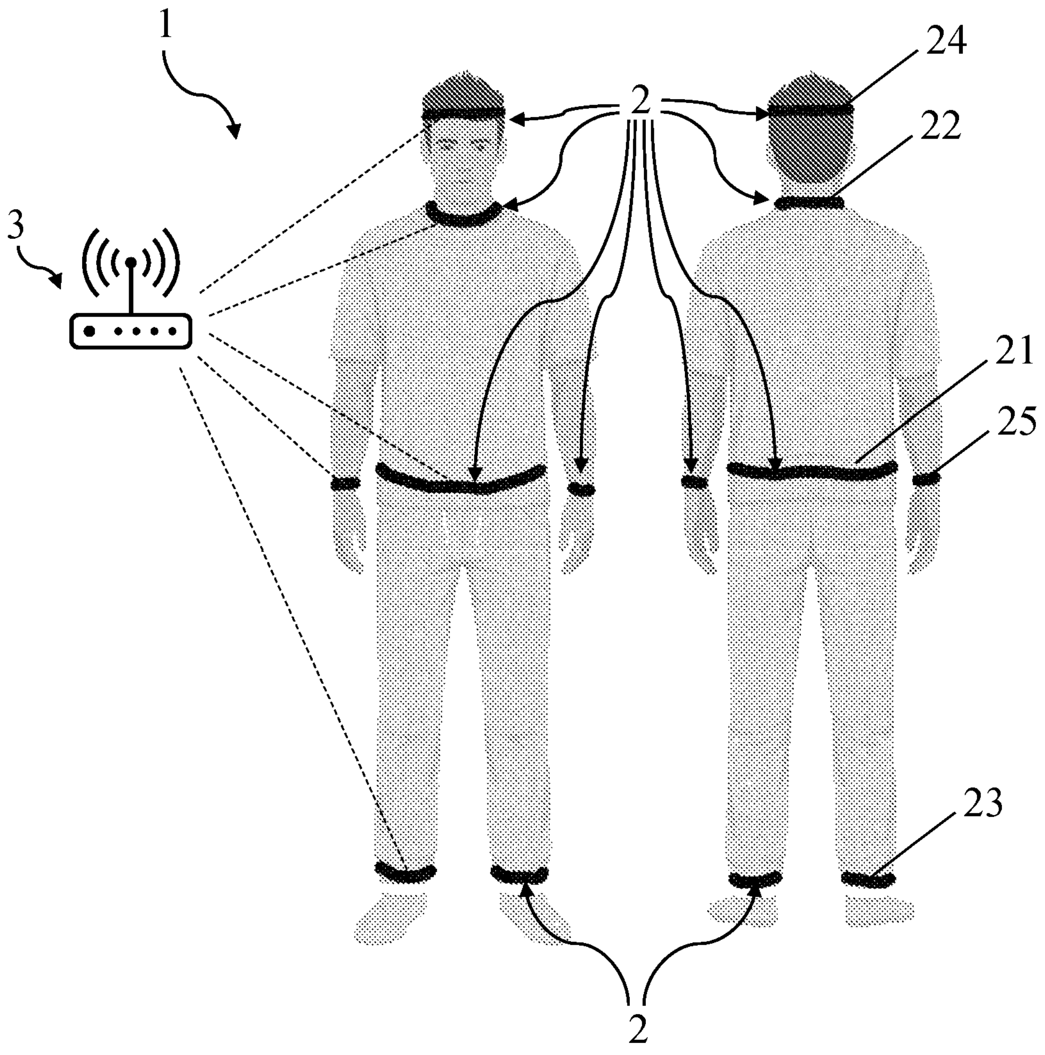
FIG. 1 shows a risk of fall detection system according to a first embodiment of the present invention.

As shown for example in FIG. 1, the wearable monitoring group 2 comprises at least a first sensor 21 configured to be attached to a lower part of the user's torso, a second sensor 22 configured to be attached to an upper part of the user's torso, and a third sensor 23 configured to be attached to one or both user's lower limb(s).

The first and second sensors 21, 22 are respectively configured to detect the position of the lower torso in relation to the upper part of the user's torso, while the third sensor 23 is configured to detect the position of the user's lower limbs in relation to the parts of the torso.

With reference to FIG. 1, preferably, the first sensor 21 is configured to be attached to the user's waist, the second sensor 22 is configured to be attached to the base of user's neck, and the third 23 sensor is configured to be attached to at least one of user's ankles.

The wearable monitoring group 2 may also comprise a fourth sensor 24 configured to be attached to user's head to detect the user's head position and/or a fifth sensor 25 configured to be attached to one or both user's upper limbs to detect the user's upper limb(s) position.

Preferably, the fourth and fifth sensors 24, 25 are respectively configured to be attached to the user's wrists and forehead as shown in FIG. 1.

Bands or belts can be used to constrain the sensors 21-25 to the relative user's body regions as shown in FIG. 1.

Figure 2:
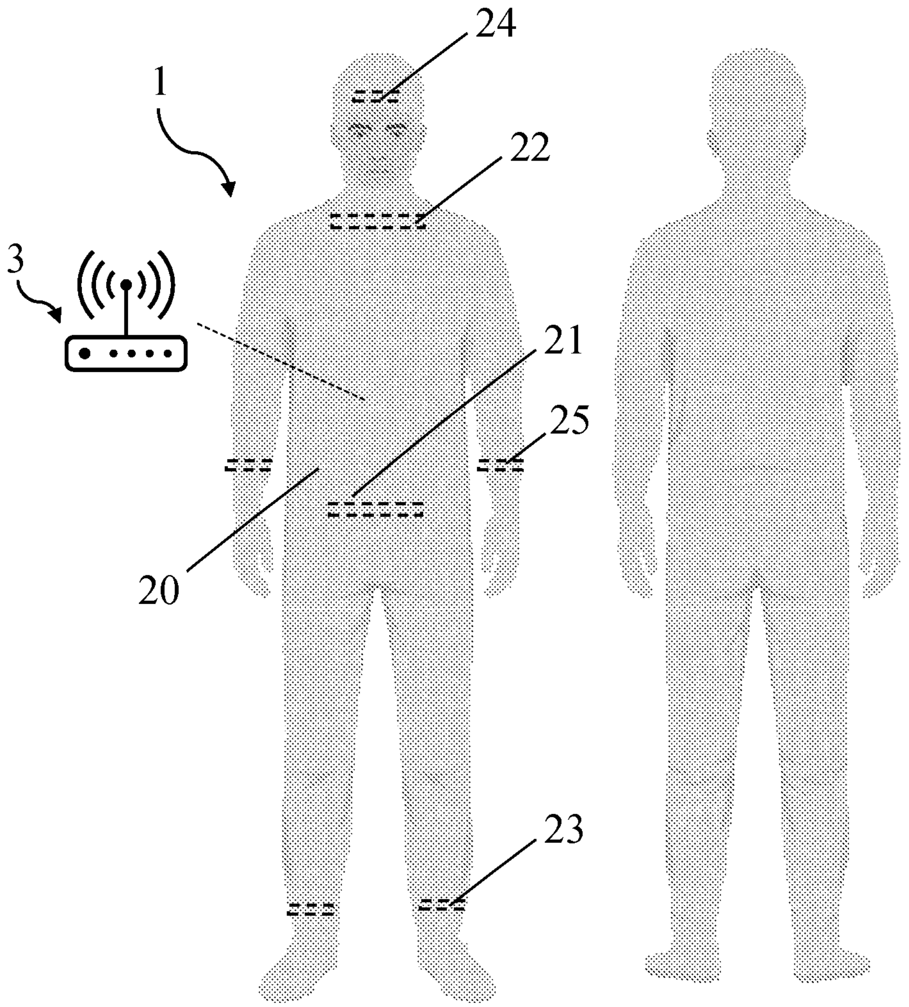
FIG. 2 shows a risk of fall detection system or the posture monitoring and correction system according to a second embodiment of the present invention.

Alternatively, the sensors 21-25 can be integrated into a garment such as a T-shirt, pants, or a full-body suit as shown in FIG. 2.

The posture data acquired by the wearable monitoring group 2 comprises at least the positions of the lower and upper part of the user's torso, and the position of the user's lower limb acquired by the first, second and third sensors 21-23, respectively.

If the wearable monitoring group 2 comprises the fourth sensor 24 and/or the fifth sensor 25, the posture data also comprises the positions of the user's head and/or user's upper limbs.

The position acquired by each sensor 21-25 comprises, for each time sampled time instant, three orthogonal spatial coordinates that locate the sensor in a 3D space.

Preferably, the first, second and third sensors 21-23 comprise inertial measurement units (IMU) and/or strain gauges.

According to an aspect, the wearable monitoring group 2 may also comprise a GPS receiver 26 configured to geolocate the user when wearing the wearable monitoring group 2. Advantageously, GPS receiver data can be used to send the user's geolocation to a care provider and/or caregiver when the sensors 21-25 detects a fall.

The risk of fall detection system 1 also comprises a processing module 3 in signal communication with the wearable monitoring group 2 to receive the posture data.

Various known technologies-such as Bluetooth, Wi-Fi, Magnetic field detection, Near Field Communication (NFC), ultra-wideband, cable connection, and more—can be used to transmit data from the wearable monitoring group 2 to the processing module 3.

The processing module 3 can be integrated in the wearable monitoring group 2 or can be external. In the latter case, the processing module 3 can be any kind of electronic device such as a smartphone, a tablet, a computer, and similar.

The processing module 3 is configured to process the acquired postured data and compute a risk of fall indicator parameter.

The risk of fall indicator parameter is computed from the relative position of at least the lower part of user's torso, upper part of user's torso, and user's lower limb(s) detected by the first, second and third sensor, respectively.

Preferably, the risk of fall indicator parameter is computed also considering the position of the user's head and/or user's upper limb detected by the fourth and/or fifth sensors, respectively. Advantageously, this allows to take in to account the head and/or upper limb cantilever effects.

To determine the risk of fall indicator parameter, the processing module 3 computes the sensor's 21, 22, 23, 24, 25 posture data computing their relative position in the 3D space.

Preferably, the first 21 and second sensors 22 are configured to detect the degree of lean of the user's torso—and the leaning direction and the processing module 3 takes into account of the degree of lean of the user's torso to determine the risk of fall indicator parameter. The degree of lean of the user's torso can be quantified by calculating the misalignment of the upper and lower part of the user's torso along a vertical direction (standing direction).

Moreover, preferably, the first 21 and second sensors 22 are configured to detect a shift in the user's pelvis that causes a shift in center of mass and the processing module 3 take into account of the shift of the user's pelvis to determine the risk of fall indicator parameter. Advantageously, this takes into account those risky situations in which there is no lean of the user's torso but a shift of the center of mass caused by a shift of the user's torso.

According to an aspect, the processing module 3 is configured to execute an artificial intelligence algorithm that receives as input the acquired posture data and, based on a set of training data memorized into the memory 30 of the processing module, computes the risk of fall indicator parameter.

The artificial intelligence algorithm is, for example, trained to be able to discern between normal static and dynamic actions—e.g. sitting, intentional forward/backward movements, walking—from falls or high fall-risk positions.

Preferably, the processing module 3 comprises a memory 30 in which the posture data, the artificial intelligence algorithm, and the set of training data are saved. In alternative embodiments, the processing module 3 is connected to a cloud where the posture data, the artificial intelligence algorithm, and the set of training data are saved.

The processing module 3 also comprises a processor 31 configured to process the posture data, in particular configured to execute the artificial intelligence algorithm, to compute the risk of fall indicator parameter.

The set of training data used to train the artificial intelligence algorithm can be acquired using the wearable monitoring group 2 or in other ways.

The risk of fall detection system 1 can be used to warn the user that is getting close to a posture which dramatically increases the risk of fall in enough time to allow the user to make a corrective action that immediately reduces this risk. It also records these incidents to warn of their increasing frequency to warn the physician and caregiver of the increasing Risk of Falls of the patient.

To this end, the risk of fall detection system 1 comprises biofeedback elements (not shown in the figures) configured to provide a feedback signal to the user upon the risk of fall indicator parameter exceeds a threshold value (e.g. when the degree of lean of user's torso along a leaning direction exceeds a threshold leaning value which can be changed over time by the physician).

The biofeedback elements may comprise of vibrators configured to provide the feedback signal to the user in the form of a vibration stimulus. According to that aspect, the vibrators are comprised of eccentric rotating masses actuated by an electric motor.

The vibrators would be placed on all sides of the user's body and the correct one activated when the danger was occurring making the biofeedback more easily detected and averted.

Preferably, the vibrators are integrated into the wearable monitoring group.

The biofeedback elements—in addition to or in place of the vibrators—can comprise acoustic sources configured to provide the feedback signal to the user in the form of a directional sound.

The acoustic source can be integrated in the wearable monitoring group or in an electronic device (e.g. phone/tablet/computer speaker) in signal communication with the processing module 3.

According one embodiment, the risk of fall detection system 1 induces a corrective action that reduces the risk of fall. For example, this can be done by increasing the vertical alignment of the lower and upper part of the user's torso. The corrective action can also be used to prevent muscle, bone and tendon injury.

Embodiments of the present invention also relate to a posture monitoring and correction system configured to monitor the posture of a user's body and induce a corrective action to pull-on muscle groups to either train better posture or to pull posture changes into place to reduce the risk of fall.

The corrective action can also be used to prevent muscle, bone, and tendon injuries, i.e. blocking the rotation of a user's body joint.

To this end, the risk of fall detection system comprises correction elements 4 configured to be attached to the user's body and to induce the above-mentioned corrective action upon the risk of fall indicator parameter or a risk of injury indicator parameter exceeding a threshold level.

The risk of injury indicator parameter and the risk of fall indicator parameter—are computed by the processing module 3 calculating the posture data. Preferably, the processing module 3 is configured to execute an artificial intelligence algorithm that receives as input the posture data and, based on a set of training data memorized into a memory 30 of the processing module 3, computes the risk of injury indicator parameter.

According to an aspect, the correction elements 4 comprise "active" elastic bands 40 configured to tighten and pull-on muscle groups to either train better posture or to pull posture changes into place to reduce the risk of fall.

Moreover, the correction elements 4 may comprise non-Newtonian fluids with shear-thickening characteristics, graphene layers that might be triggered by electrical stimulus to cause the sudden tightening or increase in tension of the clothing around the joint being strained or air bags 42 which could activate (swell) in order to harden the leg or arm clothing to act as a brace stopping the leg or arm twist before it reached an injury level or pull back the torso to avoid a fall or at least reduce a fall's injury.

In the embodiment of FIG. 2, the wearable monitoring group of posture monitoring and correction system comprises a sensorized tight-fitting garment 20. The group of sensors comprises at least a strain gauge 27 integrated into the sensorized tight-fitting garment and adapted to monitor the user's posture and muscle group movements in the monitoring region. Preferably, the group of sensors comprises a plurality of strain gauges 27 placed in the monitoring region.

In detail, the strain gauge(s) 27 can be used to detect when motions are approaching database determined levels as to risk a fall or a muscle/tendon tear in order to activate the correction elements 4.

For example, if the strain gauge(s) 27 determines that the strain is approaching a level where injury could result, then the clothing bands 40 or air bags 41 could tighten and prevent the thigh or knee from turning any farther in an attempt to prevent the anterior cruciate ligament (ACL) from being stretched too far or tearing.

The tight-fitting garment 20 can be used to track the movement and muscles of the monitoring region of the user's body while performing athletic activities.

In this case the processing module 3, that according to the above is in signal communication with the group of sensors to receive data related to the tracked movement, is configured to compute one or more training data which indicate to the user how to improve athletic performance, using an artificial intelligence algorithm.

In detail, the artificial intelligence algorithm receives as input tracking data from the group of sensors and, based on a set of training data memorized into the memory 30 of the processing module 3, computes the training data.

For example, a football quarterback changes his footing, weight shift, arm, chest and back muscles and grip on the fingers of the ball as he is throwing a pass. Artificial intelligence algorithm can develop a database for each of these positions in sports for training of younger athletes to get better or to finely tune top athletes who need to discern why they have altered their performance.

Another example is a golfer that must move the hands in a specific sequence and apply differing amounts of pressure to a golf club when accelerating the club downward toward the ball. Altering the sequence significantly alters the speed and face of the head of the club which changes the trajectory and distance in the shot. The group of sensors, when integrated in a golf gloves, can track these changes and the artificial intelligence algorithm can than train athletes to improve the amounts of pressure exerted on the golf club at the appropriate times when accelerating the club downward toward the ball.

In the following will be described a human body model that can be used to compute the risk of fall.

Figure 3:
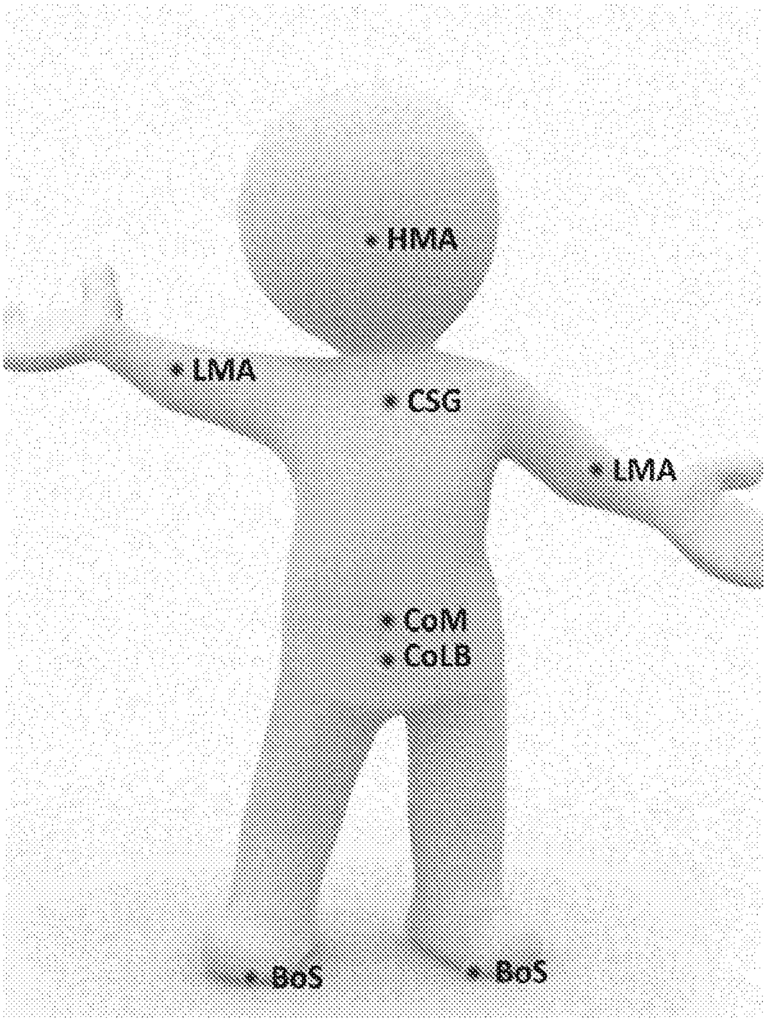
FIG. 3 shows a human body model.
Figure 4:
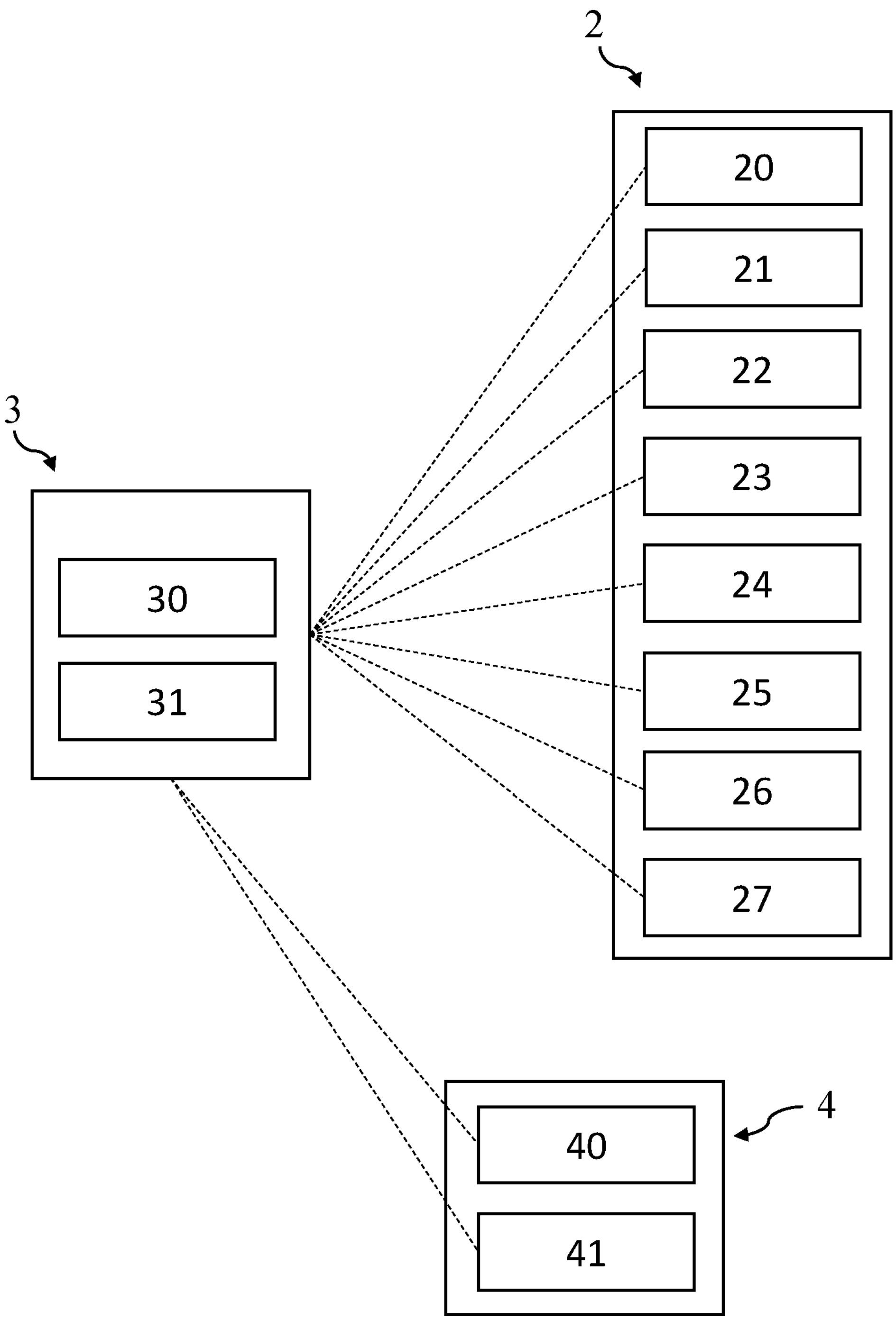
FIG. 4 shows a block diagram of a posture monitoring and correction system according to the present invention.

Referring to FIG. 3, the user's body has a Center of Mass (COM) and touches the ground in correspondence of the Base(s) of Support (BoS).

The Center of Mass can be decomposed into the Center of Shoulder Gridle (CSG) and Center of the Lower Body (CoLB).

The Center of Shoulder Gridle is composed of the clavicle and the scapula and articulates with the proximal humerus of the upper limbs. The Center of Shoulder Gridle acts like a pivot point for the upper limbs and the head. However, because the upper limbs and head have their own moment arms about the CSG, the location of the CSG can dramatically shift in the X, Y and Z location. In a first approximation, it is possible to make calculations as if the Center of Shoulder Gridle were a moment arm of about 4 feet from the Base(s) of Support.

The Center of the Lower Body does not articulate as much as the Center of Shoulder Gridle and has a shorter moment arm of less than three feet.

So when in motion and with the double support system of the legs, the person actually has several moment arms which affect balance. The person 6 must remain in balance while shifting their weight from one foot to the other and leaning forward to balance their inertia and their cadence. And the Center of Shoulder Gridle can almost instantaneously shift the Center of Mass about the Base(s) of Support. With all of these moving parts, it is not surprising that the risk of fall increases as a person's response time lengthens as they age.

Another easy way for the posture to become less stable is for the width of the double support to either become too narrow or too wide. Too narrow makes one "top heavy". Widening the stance is a common fix when someone is becoming aware of balance difficulties. It protects from sideways falls but risks a forward or backward fall.

To calculate the risk of fall, it is necessary to consider posture, which means calculating the error allowed of the Center of Mass moving with respect to the Base(s) of Support.

In a first approximation, the Center of Shoulder Gridle can be seen as the area slightly below the neck (Center of Shoulder Gridle position is detected by the second sensor 22); the Center of the Lower Body as the area of the belt around the waist (Center of the Lower Body position is detected by the first sensor 21); the Base(s) of Support as an area bounded by the geometry of the two feet and the space between them (Base(s) of Support position is detected by the third sensors 23).

In a normal situation, the Center of Mass and Base(s) of Support would be oval and about the same size while the Center of Shoulder Gridle would be round, but smaller.

Usually the Center of Mass and Base(s) of Support overlap their areas while the Center of Shoulder Gridle is normally at their geometric center.

If the person's posture while standing caused the Center of Shoulder Gridle to not be centered over either the Center of the Lower Body or the Base(s) of Support, this error would affect the risk of fall. In detail, the greater the misalignment, the greater the risk of fall.

The system, according to the present disclosure, aims to compute the risk of fall based on the decentering of the Center of Mass over the Base(s) of Support.

Incorrect weight shifting or a trip while weight shifting is responsible for two thirds of all falls. It has been noticed that the first step in a fall is often that the person shifts their weight from the Base(s) of Support on the contralateral side of the shift of weight of the Center of Shoulder Gridle or the Center of Mass. Detecting this shift will signal a higher risk of fall and will cause the system to alert the patient on the side of the shift. This is true of a side-to-side shift or a frontal or backward shift. The amount of allowable shift will be determined by the set of training data The key difference is that in a fall, the Base(s) of Support reduces in both feet in the direction of the shift (left to right or right to left or forward to back or back to forward), while in walking the Base(s) of Support shifts from one foot to the other evenly (no left to right or when the right foot is stepping forward, the left is getting all of the weight and then the right gets all of the weight in series). Also, the shifts in Center of Mass and Center of Shoulder Girdle always stay inside the Base of Support when walking, but begin to move to or beyond the Base of Support in a fall.

That which is claimed is:

1. A posture monitoring and correction system configured to monitor a posture of a user's body in a monitoring region of the user's body and induce a corrective action to the user's body, the posture monitoring and correction system comprising:

- a wearable monitoring group configured to acquire posture data related the monitoring region with a group of sensors configured to monitor the posture of the user's body in the monitoring region;
- a processing module in signal communication with the wearable monitoring group to receive the posture data, the processing module being configured to compute a risk of injury indicator parameter; and
- correction elements configured to be attached to the user's body and to induce a corrective action in the user's body upon the risk of injury indicator parameter exceeding a threshold level;
- wherein the correction elements comprise bands configured to be attached to the user's body and to shrink upon the risk of injury indicator parameter exceeding the threshold level, so that rotation of a user's body joint is blocked and/or a user's body part is stiffened.

2. The posture monitoring and correction system of claim 1, wherein:

- the wearable monitoring group comprises a sensorized tight-fitting garment; and
- the group of sensors comprises at least a strain gauge integrated into the sensorized tight-fitting garment and adapted to monitor the posture and muscle group movements of the monitoring region.

3. The posture monitoring and correction system of claim 1, wherein the correction elements comprise an air bag configured to be attached to the user's body and to swell upon the risk of injury indicator parameter exceeding the threshold level, so that rotation of a user's body joint is blocked or a user's body part is stiffened and/or protected from damage in a fall.

4. The posture monitoring and correction system of claim 1, wherein the wearable monitoring group comprises:

- a first sensor configured to be attached to a lower part of the user's torso and to detect a position of the lower part of the user's torso;
- a second sensor configured to be attached to an upper part of the user's torso and to detect a position of the upper part of the user's torso;
- a third sensor configured to be attached to a lower limb of the user's body and to detect a position of the lower limb; and
- the processing module is configured to compute the risk of injury indicator parameter from relative positions of the lower part of the user's torso, upper part of user's torso, and the lower limb detected by the first sensor, second sensor, and third sensor, respectively.

5. The posture monitoring and correction system of claim 1, further comprising biofeedback elements configured to provide a feedback signal to the user's body in a direction of a probable fall upon the risk of injury indicator parameter exceeding a threshold level.

6. The posture monitoring and correction system of claim 5, wherein the biofeedback elements comprise an acoustic source configured to provide the feedback signal to the user's body as a sound in the direction of the probable fall.

7. The posture monitoring and correction system of claim 1, wherein the correction elements can be manipulated by a software database or a physician.

8. The posture monitoring and correction system of claim 7, wherein the correction elements comprise elastic bands.

9. The posture monitoring and correction system of claim 7, wherein the correction elements comprise non-Newtonian fluids with shear-thickening characteristics, graphene layers triggered by electrical stimulus to cause a sudden tightening of clothing around a joint being strained, or air bags whose inflation will tighten the posture to protect from injury.

10. The posture monitoring and correction system of claim 1, wherein a first sensor and a second sensor of the group of sensors are configured to detect a degree of lean of user's torso along at least one leaning direction.

11. The posture monitoring and correction system of claim 1, wherein the wearable monitoring group comprises a sensor configured to be attached to a user's head to detect a position of the user's head.

12. The posture monitoring and correction system of claim 1, wherein the wearable monitoring group comprises a sensor configured to be attached to a user's upper limb to detect a position of the upper limb.

13. The posture monitoring and correction system of claim 1, wherein the wearable monitoring group comprises a GPS receiver.

14. The posture monitoring and correction system of claim 1, wherein the processing module is configured to execute an artificial intelligence algorithm that receives as input the posture data and, based on a set of training data memorized into a memory of the processing module, compute the risk of injury indicator parameter.

15. A posture monitoring and correction system configured to monitor a posture of a user's body in a monitoring region of the user's body and induce a corrective action to the user's body, the posture monitoring and correction system comprising:

- a wearable monitoring group configured to acquire posture data related the monitoring region with a group of sensors configured to monitor the posture of the user's body in the monitoring region;

a processing module in signal communication with the wearable monitoring group to receive the posture data, the processing module being configured to compute a risk of injury indicator parameter;

correction elements configured to be attached to the user's body and to induce a corrective action in the user's body upon the risk of injury indicator parameter exceeding a threshold level; and biofeedback elements configured to provide a feedback signal to the user's body in a direction of a probable fall upon the risk of injury indicator parameter exceeding a threshold level.

16. The posture monitoring and correction system of claim 15, wherein the biofeedback elements comprise an acoustic source configured to provide the feedback signal to the user's body as a sound in the direction of the probable fall.

17. The posture monitoring and correction system of claim 15, wherein the correction elements comprise bands configured to be attached to the user's body and to shrink upon the risk of injury indicator parameter exceeding the threshold level, so that rotation of a user's body joint is blocked and/or a user's body part is stiffened.

18. The posture monitoring and correction system of claim 15, wherein the correction elements can be manipulated by a software database or a physician; and the correction elements comprise non-Newtonian fluids with shear-thickening characteristics, graphene layers triggered by electrical stimulus to cause a sudden tightening of clothing around a joint being strained, or air bags whose inflation will tighten the posture to protect from injury.

19. A posture monitoring and correction system configured to monitor a posture of a user's body in a monitoring region of the user's body and induce a corrective action to the user's body, the posture monitoring and correction system comprising:

a wearable monitoring group configured to acquire posture data related the monitoring region with a group of sensors configured to monitor the posture of the user's body in the monitoring region;

a processing module in signal communication with the wearable monitoring group to receive the posture data, the processing module being configured to compute a risk of injury indicator parameter; and correction elements configured to be attached to the user's body and to induce a corrective action in the user's body upon the risk of injury indicator parameter exceeding a threshold level, the correction elements comprising non-Newtonian fluids with shear-thickening characteristics or graphene layers triggered by electrical stimulus to cause a sudden tightening of clothing around a joint being strained.

20. The posture monitoring and correction system of claim 19, wherein the correction elements further comprise bands configured to be attached to the user's body and to shrink upon the risk of injury indicator parameter exceeding the threshold level, so that rotation of a user's body joint is blocked and/or a user's body part is stiffened.

21. The posture monitoring and correction system of claim 19, further comprising biofeedback elements configured to provide a feedback signal to the user's body in a direction of a probable fall upon the risk of injury indicator parameter exceeding a threshold level.

22. The posture monitoring and correction system of claim 21, wherein the biofeedback elements comprise an acoustic source configured to provide the feedback signal to the user's body as a sound in the direction of the probable fall.

* * * * *